(12) United States Patent
Nagareo et al.

(10) Patent No.: US 8,586,644 B2
(45) Date of Patent: Nov. 19, 2013

(54) PHOTOCURABLE COMPOSITION SUITABLE FOR RUST PREVENTION OF A THREADED JOINT FOR STEEL PIPES

(75) Inventors: Tomomitsu Nagareo, Moriyama (JP); Yoshinori Kameda, Kusatsu (JP); Keishi Matsumoto, Takarazuka (JP); Takayuki Kamimura, Takarazuka (JP); Masaru Takahashi, Nishinomiya (JP); Kunio Goto, Kobe (JP); Ryuichi Imai, Kainan (JP)

(73) Assignees: Nippon Steel & Sumitomo Metal Corporation, Tokyo (JP); Vallourec Mannesmann Oil & Gas France, Aulnoye-Aymeries (FR); Chugoku Marine Paints, Ltd., Hiroshima (FR)

( * ) Notice: Subject to any disclaimer, the term of this patent is extended or adjusted under 35 U.S.C. 154(b) by 0 days.

(21) Appl. No.: 13/295,132

(22) Filed: Nov. 14, 2011

(65) Prior Publication Data

US 2012/0112456 A1 May 10, 2012

Related U.S. Application Data

(63) Continuation of application No. PCT/JP2010/059587, filed on Jun. 1, 2010.

(30) Foreign Application Priority Data

Jun. 2, 2009 (JP) .................................. 2009-132937

(51) Int. Cl.
*C08F 2/46* (2006.01)
*C08G 61/04* (2006.01)

(52) U.S. Cl.
USPC .................................................. 522/1; 520/1

(58) Field of Classification Search
USPC .................................................. 522/1; 520/1
See application file for complete search history.

(56) References Cited

U.S. PATENT DOCUMENTS 7,829,643 B2 * 11/2010 Knischka et al. ............. 526/220
2005/0171227 A1 * 8/2005 Weine Ramsey ................. 522/1

FOREIGN PATENT DOCUMENTS

| JP | 08-231653 | | 9/1996 |
|---|---|---|---|
| JP | 2002-080511 | * | 3/2002 |
| JP | 2002-080511 | | 3/2003 |
| JP | 2009-007567 | | 1/2009 |
| WO | 98/36325 | | 8/1998 |
| WO | 2004/063294 | | 7/2004 |
| WO | WO 2005/059048 | * | 6/2005 |
| WO | 2006/075774 | | 7/2006 |
| WO | 2006/104251 | | 10/2006 |
| WO | 2007/042231 | | 4/2007 |

* cited by examiner

*Primary Examiner* — Ling Choi
*Assistant Examiner* — Jessica E Whiteley
(74) *Attorney, Agent, or Firm* — Clark & Brody

(57) ABSTRACT

A thin and highly transparent coating having excellent air tightness, adhesion to a substrate, lubricating properties, galling resistance, and corrosion resistance is formed on the surface of a metal substrate and particularly on the surface of a threaded joint which is used for connection of oil country tubular goods. A photocurable composition comprising (A) a photocurable (meth)acrylate resin, (B) a (meth)acrylate monomer selected from a monofunctional (meth)acrylate monomer and a difunctional (meth)acrylate monomer, (C) a trifunctional or higher multifunctional (meth)acrylate monomer, (D) a photopolymerization initiator, (E) a benzotriazole anticorrosive agent, (F) an anticorrosive pigment selected from a phosphate anticorrosive pigment and calcium ion-exchanged silica, and (G) a phosphate ester is used to form a photocured coating.

13 Claims, 1 Drawing Sheet

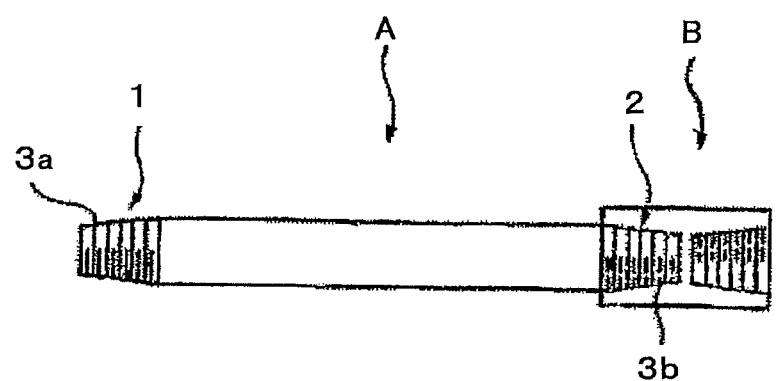

PHOTOCURABLE COMPOSITION SUITABLE FOR RUST PREVENTION OF A THREADED JOINT FOR STEEL PIPES

TECHNICAL FIELD

This invention relates to a photocurable composition and its use (such as a photocured coating, a substrate having a photocured coating, and a threaded joint for steel pipes having a photocured coating), a rust-preventing method for a threaded joint for steel pipes using the composition, and a method of manufacturing a threaded joint for steel pipes having a photocured coating. A photocurable composition according to the present invention is particularly suitable for rust-preventing surface treatment of a threaded joint for steel pipes used for connecting steel pipes, and particularly oil country tubular goods (OCTG).

BACKGROUND ART

Oil country tubular goods (such as tubing, through which crude oil or other fluid flow, and casing which surrounds tubing) used for excavating oil wells for exploitation of crude oil and natural gas typically have a length of ten some meters and are connected using a threaded joint until a length reaching an oil well is achieved. In the past, the depth of oil wells was 2,000-3,000 meters. However, recently, in deep oil wells such as for undersea oil fields, the depth of oil wells may reach 8,000-10,000 meters or more.

In its environment of use, a threaded joint used for connecting oil country tubular goods is acted upon by loads such tensile forces in the axial direction caused by the weight of oil country tubular goods and the threaded joints themselves, compound pressure due to internal and external surface pressure, and geothermal heat. Therefore, a threaded joint for steel pipes needs to be able to maintain the gastightness of oil country tubular goods without being damaged even in such a severe environment.

A typical threaded joint used for connecting oil country tubular goods has a pin-box structure such as schematically shown in FIG. 1. A pin 1 is a joint component having a male or external thread 3a which is typically formed on the end of an oil country tubular good A. A box 2 is a joint component having a female or internal thread 3b which is typically formed on the inner surface of a threaded joint member B (a coupling). Unthreaded metal contact portions are formed close to the distal end of the male thread 3a of the pin 1 and close to the proximal end of the female thread 3b of the box 2. Gastightness of the oil country tubular good A is guaranteed by inserting one end of the oil country tubular good A into the threaded joint member B and tightening the male threads 3a and the female threads 3b so that the unthreaded metal contact portions of the pin and the box contact each other.

During the process of lowering tubing or casing into an oil well, due to various problems, a threaded joint which has previously been connected is sometimes lifted out of the oil well, retightened, and then lowered into the well. API (American Petroleum Institute) requires galling resistance and gastightness such that even if makeup (tightening) and breakout (loosening) are carried out ten times for a joint for tubing and three times for a joint for casing, there is no occurrence of unrepairable seizing referred to as galling and the gastightness of oil country tubular goods is maintained.

In order to increase gastightness and galling resistance at the time of makeup, in the past, a viscous liquid lubricant containing heavy metal powders (referred to as compound grease) was applied to the contact surfaces (the threaded portions and the unthreaded metal contact portions) of a threaded joint. Such a compound grease is prescribed by API BUL 5A2. Compound grease also exhibits corrosion resistance (rust-preventing properties) in that it prevents the formation of rust on the contact surfaces to which it is applied.

With the object of increasing the retention of compound grease (the adhesion of grease to the contact surfaces of a threaded joint) and improving the lubricating properties of a threaded joint, it has been proposed to perform various types of surface treatment such as nitriding, plating (such as zinc-based plating or dispersion plating), or phosphating treatment to form one or more surface treatment layers on the contact surfaces of a threaded joint.

However, the use of compound grease has the problem that there is a concern of adverse effects on the environment and humans. Compound grease contains a large amount of heavy metal powders such as zinc, lead, and copper. Therefore, at the time of makeup of a threaded joint, the applied grease is washed off or overflows to the outer surface, and there is the possibility of harmful heavy metals such as lead and the like having an adverse effect on the environment (particularly sea life). In addition, the process of applying compound grease worsens the work environment, so there is a concern of toxic effects on the human body.

In recent years, as a result of the enactment in 1998 of the OSPAR Convention (Oslo-Paris Convention) relating to preventing maritime pollution in the Northeast Atlantic, strict restrictions with respect to the environment are advancing on a global scale, and the use of compound grease is already being restricted in some regions.

Accordingly, in order to avoid adverse effects on the environment and humans in the excavation of gas wells and oil wells, a demand for a threaded joint which can exhibit excellent galling resistance without using compound grease has developed.

Another problem of compound grease is that it contains a large amount of a solid lubricant typified by graphite, and it forms a coating which is not transparent. A pin having a threaded portion on the outer surface of a tubular body more easily undergoes damage during transport or at the time of makeup than does a box having a threaded portion on the inner surface of a tubular body. Therefore, a pin is often subjected to visual inspection for damage to the threaded portion thereof prior to makeup operations in order to avoid the occurrence of sudden galling caused by damage to the threaded portion of the pin which is formed on the outer surface of a pipe. When a compound grease has been applied, it was necessary at the time of inspection to clean the pin by washing the applied compound grease off and then to reapply compound grease after inspection. As described above, such operation is harmful to the environment and is time-consuming. If the coating were transparent, the threaded portion could be visually inspected for damage without removing the applied coating, and the labor required for inspection could be greatly decreased.

After an oil country tubular good is manufactured, it is sometimes stored for a number of months or longer until it is actually used. Therefore, "storage grease" is applied to the contact surfaces of a threaded joint. Like compound grease, storage grease is not transparent, so each time inspection is carried out, it is necessary to wash it off. Therefore, like compound grease, storage grease has an environmental problem.

In below-described Patent Documents 1-3, one of the present applicants proposed the following threaded joints which can be used to connect oil country tubular goods without applying compound grease or storage grease.

Patent Document 1 (WO 2006/104251): A threaded joint in which the contact surfaces of at least one of a pin and a box are coated with a coating having a two-layer structure (a two-layer coating) which is constituted by a lower viscous liquid or semisolid lubricating coating and an upper dry solid coating. The dry solid coating can be formed from a thermosetting resin such as an acrylic resin or an ultraviolet curable resin. Since the viscous liquid or semisolid lubricating coating is tacky, foreign matter easily adheres to it, but by forming a dry solid coating atop it, its tackiness is eliminated. The dry solid coating is destroyed at the time of makeup of a threaded joint, and this upper coating does not impair the lubricating properties of the lubricating coating beneath it.

Patent Document 2 (WO 2007/042231): A threaded joint having a thin, non-tacky lubricating coating formed on a threaded portion (e.g., of a pin or a box). The lubricating coating contains solid lubricant particles dispersed in a solid matrix exhibiting plastic or viscoplastic rheological properties (flow properties). The solid matrix preferably has a melting point in the range of 80-320° C. This lubricating coating is formed by spray coating in a molten state (hot melt spraying), flame spraying using a powder, or spray coating of an aqueous emulsion. A composition used for hot melt spraying comprises polyethylene as a thermoplastic polymer, wax (such as carnauba wax) and a metal soap (such as zinc stearate) as a lubricant component, and calcium sulfonate as a corrosion inhibitor.

Patent Document 3 (WO 2006/075774): A threaded joint in which a contact surface of at least one of a pin and a box is coated with a two-layer coating constituted by a lower solid lubricating coating comprising a lubricant powder and a binder, and an upper solid anticorrosive coating which does not contain solid particles.

In addition, Patent Document 4 (JP 2002-080511 A1) discloses a photocurable composition which comprises (A) a photocurable (meth)acrylate resin, (B) a carboxyl group-containing monofunctional (meth)acrylate monomer, (C) a (meth)acrylate phosphate compound, (D) a difunctional (meth)acrylate monomer, (E) a trifunctional or higher multifunctional (meth)acrylate monomer, (F) a photopolymerization initiator, and optionally an anticorrosive pigment. In an example of Patent Document 4, a composition is illustrated in which a condensed phosphate aluminum salt is used as an anticorrosive pigment. According to Patent Document 4, by using the photocurable composition disclosed therein, a coating having excellent properties in terms of adhesion to a steel pipe, rust prevention, and surface smoothness can be formed.

Patent Document 1: WO 2006/104251
Patent Document 2: WO 2007/042231
Patent Document 3: WO 2006/075774
Patent Document 4: JP 2002-080511 A1

SUMMARY OF THE INVENTION

The two-layer coating for a threaded joint described in Patent Document 1 has excellent lubricating properties and corrosion resistance. However, it has the problems that (1) it is necessary to form a two-layer coating comprising a lubricating coating and a dry solid coating formed atop it, so the coating process is complicated, (2) at the time of thread makeup, flakes form when the two-layer coating is destroyed, so the subsequent external appearance is not so good, and (3) the coating has low transparency. In addition, there is a desire for a coating having superior corrosion resistance, adhesion, and other properties.

The coating for a threaded joint described in Patent Document 2 also has superior lubricating properties and corrosion resistance. However, since this coating is not transparent, it is difficult to perform inspection in order to check the presence or absence of damage to the threaded portion.

The coating for a threaded joint described in Patent Document 3 has extremely high corrosion resistance. However, due to the solid lubricating coating which is a hard solid coating, even if the solid corrosion preventing coating formed atop it breaks into pieces at the time of makeup of a threaded joint, it is difficult for the pieces to become embedded in the underlying solid lubricating coating. As a result, the lubricating properties of this two-layer coating are slightly inferior.

A coating formed from the photocurable composition described in Patent Document 4 has excellent properties in adhesion to a steel pipe, rust-preventing properties, and surface smoothness. However, it has the problems that (1) its adhesion to a substrate is low in an environment in which high and low temperatures are repeated which is a typical environment of use of a steel pipe (particularly an oil country tubular good) such as regions which reach a high temperature, regions which become extremely cold in winter, and regions which experience extremes of hot and cold during the day and night, and (2) although it is thought necessary to have corrosion resistance which can prevent the formation of rust even in such environments, the performance of this coating is inadequate in this respect.

An object of the present invention is to solve the above-described problems of the prior art. Namely, it is an object of the present invention to provide a photocurable composition which can form a coating which has excellent properties in terms of gastightness, adhesion to a substrate, lubricating properties, galling resistance, and corrosion resistance without using a compound grease or a storage grease and which can form a thin film having high transparency.

Another object of the present invention is to provide a photocured coating, a substrate with a photocured coating, and a threaded joint for steel pipes having a photocured coating which are formed using the photocurable composition, as well as a rust-preventing method for a threaded joint for steel pipes and a method of manufacturing a threaded joint for steel pipes having a photocured coating formed from the photocurable composition.

According to the present invention, the above-described objects can be achieved by a photocurable composition which comprises the following components (A) to (G):

(A) a photocurable (meth)acrylate resin,
(B) a (meth)acrylate monomer selected from a monofunctional (meth)acrylate monomer and a difunctional (meth)acrylate monomer,
(C) a trifunctional or higher multifunctional (meth)acrylate monomer,
(D) a photopolymerization initiator,
(E) a benzotriazole anticorrosive agent,
(F) an anticorrosive pigment selected from a phosphate anticorrosive pigment and calcium ion-exchanged silica, and
(G) a phosphate ester.

Some preferred embodiments of a photocurable composition according to the present invention has the following features:

the phosphate ester (G) is a (meth)acrylate having a phosphate group in its molecule;
the photocurable (meth)acrylate resin (A) is at least one member selected from the group consisting of a polyester (meth)acrylate, an epoxy (meth)acrylate, a polyether (meth)acrylate, and a polyurethane (meth)acrylate;
the composition contains, in mass parts, 5-50 parts of component (A), 5-50 parts of component (B), 5-30 parts of component (C), 1-15 parts of component (D), 0.1-5 parts of component (E), 1-10 parts of component (F), and 1-5 parts of component (G), wherein the sum of components (A)-(G) is 100 parts by mass;

it further contains (H) a lubricant; and it further contains (I) a fluorescent brightening agent.

The present invention also provides:

use of the above-described photocurable composition as a material for forming a rust-preventing coating for a threaded joint for steel pipes;

a photocured coating formed from the photocurable composition;

the above-described photocured coating having a turbidity of at most 40%;

a substrate with a photocured coating having the above-described photocured coating;

a threaded joint for steel pipes with a photocured coating having the above-described photocured coating on the surface of a pin and/or a box of a threaded joint for steel pipes;

a rust-preventing method for a threaded joint for steel pipes comprising the steps of applying the above-described photocurable composition to the surface of a pin and/or a box of a threaded joint for steel pipes and then irradiating the coated surface with active energy rays to cure the applied composition and form a photocured coating; and a method of manufacturing a threaded joint for steel pipes with a photocured coating comprising the steps of applying the above-described photocurable composition to the surface of a pin and/or a box of a threaded joint for steel pipes and then irradiating the coated surface with active energy rays to cure the applied composition and form a photocured coating.

A photocurable composition according to the present invention can form a photocured coating (hereinafter referred to as a photocured coating of the present invention) which has excellent properties in terms of gastightness, adhesion to a substrate, lubricating properties, galling resistance, and corrosion resistance and which is a thin film with high transparency on the surface of a substrate and particularly on the surface of a threaded joint for steel pipes and particularly for oil country tubular goods. The lubricating properties and corrosion resistance which the photocured coating of the present invention exhibits are comparable to those of a compound grease and a storage grease.

As a result, the present invention can achieve the following effects.

(1) It is not necessary to use a compound grease or a storage grease at the time of forming a coating on a threaded joint or at the time of makeup, thereby eliminating adverse effects on the environment and humans caused by the use of such a grease.

(2) A threaded joint having a photocured coating of the present invention has excellent corrosion resistance. Therefore, even when oil country tubular goods are connected after a long period of storage, it is not necessary to perform any special restoration treatment and a threaded joint can be used as is.

(3) A threaded joint having a photocured coating of the present invention can be inspected to check the threaded portion thereof for damage while it maintains the photocured coating because the coating is thin and has high transparency. Therefore, it is not necessary to peel off the coating before inspection.

(4) Steel pipes (and particularly oil country tubular goods) are exported to regions which experience high temperatures, regions which are extremely cold in winter, and regions which have severe variations between hot and cold in the day and night. Therefore, a coating formed on a threaded joints for steel pipes is required to have adhesion to a substrate such that it does not peel off the substrate even in an environment having repeated high and low temperatures. A photocured coating of the present invention satisfies such demands. Accordingly, the coating does not peel off when a threaded joint is actually made up, and the lubricating properties of the joint during makeup do not deteriorate.

(5) A photocured coating of the present invention has a surface with good lubricating properties (or a low coefficient of friction). As a result, when a pin of a threaded joint for steel pipes is inserted into a box, the threaded joint can be smoothly tightened without cross threading of the male and female threads and without damage of a thread by a mating thread.

(6) A photocured coating of the present invention does not interfere with the galling resistance of a lubricant or a lubricating coating normally used when connecting steel pipes.

BRIEF EXPLANATION OF THE DRAWINGS

FIG. 1 is a schematic view of the pin-box structure of a typical threaded joint used for connecting oil country tubular goods.

EMBODIMENTS OF THE INVENTION

Below, a photocurable composition and uses thereof (such as a photocured coating, a substrate with a photocured coating, and a threaded joint for steel pipes having a photocured coating), a rust-preventing method for a threaded joint for steel pipes using this photocurable composition, and a method of manufacturing a threaded joint for steel pipes having a photocured coating will be explained in detail together with preferred modes thereof. A photocurable composition according to the present invention is particularly suitable as a material for forming a rust-preventing coating for a threaded joint for steel pipes.

In the present invention, various terms have the following definitions.

A pin refers to a joint component having male threads. For example, it is a joint component having male threads formed on the ends of an oil country tubular good. A box refers to a joint component having female threads. For example, it is a joint component having female threads formed on the inner surface of a threaded joint member (a coupling).

A threaded joint for steel pipes is a typical threaded joint used for connection of steel pipes (such as oil country tubular goods). A typical threaded joint for steel pipes used for connecting oil country tubular goods has a pin-box structure. Unthreaded metal contact portions are formed close to the distal end of the male threads of the pin and close to the proximal end of the female threads of the box. Gastightness of a threaded joint can be guaranteed by inserting one end of an oil country tubular good into a threaded joint member and tightening the male threads and the female threads until the unthreaded metal contact portions of the pin and box contact each other and form a metal-to-metal seal.

Various types of threaded joints for steel pipes having this type of pin-box structure include (1) a threaded joint for steel pipes constituted by a steel pipe having a pin on the outer surface of both of its ends and a threaded joint member (a coupling) which is a separate connecting member from the steel pipe and which has a box on its inner surface on both sides thereof, (2) a threaded joint for a steel pipe constituted by a steel pipe having a box on its inner surface at both of its ends and a threaded joint member having a pin on its outer surface on both sides thereof, and (3) an integral threaded joint constituted by a steel pipe having a pin (which has male threads formed thereon) on the outer surface of one end of the pipe and a box (having female threads formed thereon) on the inner surface of its other end (namely, steel pipes are directly connected to each other without using a threaded joint member). Thus, a threaded joint for steel pipes collectively refers to the combination of a steel pipe and a threaded connecting member (above-described (1) and (2)) and individual steel pipes (above-described (3)).

[Photocurable Composition]

A photocurable composition according to the present invention comprises (A) a photocurable (meth)acrylate resin, (B) a (meth)acrylate monomer selected from a monofunctional (meth)acrylate monomer and a difunctional (meth)acrylate monomer, (C) a trifunctional or higher multifunctional (meth)acrylate monomer, (D) a photopolymerization initiator, (E) a benzotriazole anticorrosive agent, (F) an anticorrosive pigment selected from a phosphate anticorrosive pigment and calcium ion-exchanged silica, and (G) a phosphate ester.

In addition, the photocurable composition may contain various additives (such as (H) a lubricant and (I) a fluorescent brightening agent) as optional components. In each of the above-described essential components and optional components, one member selected from the class of the component can be used singly, or two or more members selected therefrom can be used in combination.

The above-described components (A)-(G) of which the above-described photocurable composition is comprised are all known substances, and compositions which comprise some of these components have been disclosed in the prior art. However, a coating formed from a composition comprising some of these components did not necessarily have a good balance between corrosion resistance and adhesion to a substrate in an environment with repeated high and low temperatures. In contrast, a photocurable composition according to the present invention comprising the above-described components (A) (G) as essential components has the following characteristics.

(1) Components (A), (B), and (C) are resinous film-forming components in a photocurable composition according to the present invention, and all of them are photopolymerizable. In other words, a photocurable composition according to the present invention contains substantially no resin components which do not undergo photopolymerization. Therefore, the overall composition is rapidly cured by irradiation with active energy rays and can form a coating which as a whole has a uniform degree of cross linking. Such a coating has excellent adhesion to a substrate even in an environment with repeated high and low temperatures, and it has a high degree of corrosion resistance.

(2) Due to the rust-preventing action of the benzotriazole anticorrosive agent (E) and the anticorrosive pigment (F) selected from a phosphate anticorrosive pigment and calcium ion-exchanged silica with respect to a substrate metallic material, a photocured coating of the present invention exhibits excellent corrosion resistance which is comparable to that of compound grease and storage grease. Accordingly, this coating has a good balance between the finished external appearance, adhesion to a substrate in an environment with repeated high and low temperatures, and corrosion resistance. Each of these properties is particularly important for a material which is used to form a rust-preventing coating on a threaded joint for steel pipes. From this standpoint, a photocurable composition according to the present invention is a superior material for forming a rust-preventing coating on a threaded joint for steel pipes compared to a conventional composition.

(3) By using a benzotriazole anticorrosive agent (E), the surface of a photocured coating of the present invention has improved lubricating properties. Although the reason therefor is uncertain, it is thought that a benzotriazole anticorrosive agent (E) is more readily adsorbed by a substrate steel surface compared to other components constituting the photocurable composition, so the composition develops a concentration distribution which varies in the thickness direction of the coating, as a result of which a hardness gradient develops in the thickness direction of the coating (the hardness decreases toward the substrate), and this hardness gradient has a beneficial effect on lubricating properties. On the other hand, it is thought that this hardness gradient is not suitably obtained when one or more of the essential components of a photocurable composition according to the present invention is absent.

Below, each of the above-described components will be explained in detail.

(A) Photocurable (Meth)Acrylate Resin

As the photocurable (meth)acrylate resin (A), for example, at least one member selected from the group consisting of a polyester (meth)acrylate, an epoxy (meth)acrylate, a polyether (meth)acrylate, and a polyurethane (meth)acrylate is used.

An example of the polyester (meth)acrylate is a polyester (meth)acrylate obtained by reacting (meth)acrylic acid with a polyester prepared from a polybasic acid or an anhydride thereof and a polyhydric alcohol. Examples of the polybasic acid include phthalic acid, succinic acid, adipic acid, glutaric acid, sebacic acid, isosebacic acid, tetrahydrophthalic acid, hexahydrophthalic acid, dimer acid, trimellitic acid, pyromellitic acid, pimelic acid, azelaic acid, and the like. Examples of the polyhydric alcohol include 1,6-hexanediol, diethylene glycol, 1,2-propylene glycol, 1,3-butylene glycol, neopentyl glycol, dipropylene glycol, polyethylene glycol, polypropylene glycol, and the like.

An example of the epoxy (meth)acrylate (also referred to as an epoxy (meth)acrylate resin) is a (meth)acrylic acid modified epoxy resin obtained by adding (meth)acrylic acid to an epoxy resin or an alicyclic epoxy resin. The epoxy resin which is subjected to modification can be prepared, for example, by reacting bisphenol A, bisphenol F, bisphenol S, or phenol novolak with epichlorohydrin. The alicyclic epoxy resin which is subjected to modification can be prepared, for example, by reacting cyclopentadiene oxide or cyclohexene oxide with epichlorohydrin.

An example of the polyether (meth)acrylate is a polyether (meth)acrylate obtained by an ester exchange reaction between a polyether and a (meth)acrylate ester such as ethyl methacrylate. Examples of the polyether include polyethers obtained by ethoxylated or propoxylated trimethylolpropane, pentaerythritol or the like, or polyetherification of 1,4-propanediol or the like.

An example of the polyurethane (meth)acrylate is a polyurethane (meth)acrylate obtained by reacting an isocyanate compound, a polyol compound and a hydroxy group-containing (meth)acrylate compound. Examples of the isocyanate compound include tolylene diisocyanate, xylylene diisocyanate, hexamethylene diisocyanate, isophorone diisocyanate, and the like. Examples of the polyol compound include an adduct of hydrogenated bisphenol A and ethylene oxide, hydrogenated bisphenol A, neopentyl glycol, 1,6-hexanediol, trimethylolpropane, and the like. Examples of the hydroxy group-containing (meth)acrylate compound include hydroxy group-containing alkyl esters of (meth)acrylic acid such as 2-hydroxyethyl (meth)acrylate, 2-hydroxypropyl (meth) acrylate, and 2-hydroxybutyl (meth)acrylate.

As the (meth)acrylate resin (A), a polyester (meth)acrylate, an epoxy (meth)acrylate (a (meth)acrylic acid modified epoxy resin), and a polyurethane (meth)acrylate are preferred.

Taking into consideration the coating hardness and viscosity of the coating composition, the glass transition temperature (Tg) of the (meth)acrylate resin (A) is usually from −30° C. to +200° C. and preferably from −20° C. to +160° C., and the average molecular weight (Mn) thereof is normally 500-200,000 and preferably 500-80,000. The viscosity at 25° C. of the (meth)acrylate resin (A) is normally 500-100,000 mPa-sec and preferably 1000-80,000 mPa-sec.

The (meth)acrylate resin (A) can be prepared by suitably selecting the starting monomers such that at least one recurring unit selected from a recurring unit derived from (meth) acrylic acid and a recurring unit derived from a (meth)acrylate ester is contained in the molecule of the resulting resin and that the properties of the resulting resin are within the above-defined ranges and by polymerizing the selected starting monomers using a known technique (e.g., solution free radical polymerization).

Examples of the starting monomers include (meth)acrylic acid and (meth)acrylate esters which are normally used. The (meth)acrylate ester includes alkyl esters of (meth)acrylic acid (in which the alkyl contains 1-18 carbon atoms) and cycloalkyl esters of (meth)acrylic acid (in which the cycloalkyl contains 3-8 carbon atoms). Specific examples of the (meth)acrylate ester include methyl, ethyl, n-propyl, iso-propyl, butyl (n-, i-, t-), hexyl, 2-ethylhexyl, n-octyl, decyl, lauryl, stearyl, and cyclohexyl esters of (meth)acrylic acid. Among these, methyl (meth)acrylate, ethyl (meth)acrylate, and butyl (meth)acrylate are preferred.

Other monomers which can be copolymerized with (meth) acrylic acid or the above-described (meth)acrylate esters can be used as a starting monomer. Examples of other monomers are alkoxy alkyl esters of (meth)acrylic acid (the alkoxy alkyl having 2-18 carbon atoms) such as methoxyethyl (meth)acrylate, methoxybutyl (meth)acrylate, and ethoxybutyl (meth) acrylate; aminoalkyl esters of (meth)acrylic acid such as N,N-dimethylaminoethyl (meth)acrylate and N,N-dimethylaminopropyl (meth)acrylate; and hydroxy group-containing alkyl esters of (meth)acrylic acid such as 2-hydroxyethyl (meth)acrylate, hydroxypropyl (meth)acrylate, and hydroxybutyl (meth)acrylate.

Macromonomers such as the above-described polyester (meth)acrylate, epoxy (meth)acrylate, polyether (meth)acrylate, and polyurethane (meth)acrylate can also be used as the starting monomer.

(B) (Meth)Acrylate Monomer Selected from Monofunctional (Meth)Acrylate Monomers and Difunctional (Meth) Acrylate Monomers Each of a monofunctional (meth)acrylate monomer and a difunctional (meth)acrylate monomer (B) and a trifunctional or higher multifunctional (meth)acrylate monomer (C) undergoes photopolymerization and constitutes a portion of the resulting polymer. These monomers also function as a diluting agent of the photocurable (meth)acrylate resin (A) when preparing the photocurable composition, thereby improving the applicability of the composition and enabling the preparation of a solvent-free coating composition.

As each of these (meth)acrylate monomers, it is preferable to use a monomer which has good reactivity (such as the ability to copolymerize) with the photocurable (meth)acrylate resin and a high curing rate. As the component (B), either a monofunctional (meth)acrylate monomer or a difunctional (meth)acrylate monomer can be used alone, or both of them can be used in combination.

Examples of the monofunctional (meth)acrylate monomer include 2-ethylhexyl (meth)acrylate, phenoxyethyl (meth) acrylate, ethoxyethyl (meth)acrylate, butoxyethyl (meth) acrylate, 2-hydroxypropyl (meth)acrylate, methyltriglycol (meth)acrylate, isodecyl (meth)acrylate, isobornyl (meth) acrylate, dicyclopentanyl (meth)acrylate, dicyclopenteny-loxyethyl (meth)acrylate, lauryl (meth)acrylate, and the like.

As the difunctional (meth)acrylate monomer, for example, at least one member selected from an aliphatic di(meth)acrylate, an aliphatic di(meth)acrylate having an ether linkage, an alicyclic di(meth)acrylate, an aromatic di(meth)acrylate, and derivatives of these compounds can be used.

Examples of the aliphatic di(meth)acrylate include 1,3-butyleneglycol di(meth)acrylate, 1,4-butanediol di(meth) acrylate (BDDA, 1,4-butyleneglycol di(meth)acrylate), neo-pentylglycol di(meth)acrylate (NPGDA), hydroxypivalic acid neopenty glycol di(meth)acrylate (HPNDA), 1,6-hexanediol di(meth)acrylate (HDDA, 1,6-hexyleneglycol di(meth)acrylate), and the like.

Examples of the aliphatic di(meth)acrylate having an ether linkage include diethyleneglycol di(meth)acrylate (DE-GDA), tetraethyleneglycol di(meth)acrylate (TEGDA), polyethylene glycol 400 di(meth)acrylate (PEG400DA), tripropyleneglycol di(meth)acrylate (TPGDA), and the like.

Examples of the alicyclic di(meth)acrylate include dicyclopentanyl di(meth)acrylate and the like. Examples of the aromatic di(meth)acrylate include bisphenol A diglycidyl ether di(meth)acrylate and the like.

Among these, a monofunctional (meth)acrylate monomer, an aliphatic di(meth)acrylate, and an aliphatic di(meth)acrylate having an ether linkage are preferred as component (B).

(C) Trifunctional or Higher Multifunctional (Meth)Acrylate Monomer

The trifunctional or higher multifunctional (meth)acrylate monomer (C) is a (meth)acrylate monomer having at least three and preferably 3-6 polymerizable unsaturated groups such as (meth)acryloyl groups or (meth)acryloyloxy group per molecule.

The trifunctional or higher multifunctional (meth)acrylate monomer (C) can be prepared, for example, by reacting a compound having three or more hydroxyl groups in the molecule with a (meth)acrylic acid or a (meth)acrylic acid derivative having a carboxyl group at a ratio of at least 3 moles of the latter to 1 mole of the former.

Specific examples of a trifunctional (meth)acrylate monomer include trimethylolpropane tri(meth)acrylate (TMPTA), trimethylolpropaneethoxy tri(meth)acrylate, trimethylolpropanepropoxy tri(meth)acrylate, pentaerythritol tri(meth) acrylate (PETA), glycerinepropoxy tri(meth)acrylate (GPTA), and the like.

(D) Photopolymerization Initiator

Any known photopolymerization initiator can be used as component (D). A preferred photopolymerization initiator (D) includes benzoin, benzoin methyl ether, benzoin isopropyl ether, benzoin isobutyl ether, α-acrylbenzoin, benzil, benzophenone, 2-ethylanthraquinone, 1-chloroanthraquinone, 2-chloroanthra-quinone, thioxanthone, chlorothioxanthone, 2-methylthioxanthone, 2-hydroxy-2-methylpropiophenone, 2,2-dimethoxy-2-phenylacetophenone, 1-hydroxycyclo-hexyl phenyl ketone, 2-methyl-[4-(methyl)thiophenyl]-2-morpholino-1-propanone, and the like.

(E) Benzotriazole Anticorrosive Agent

Examples of the benzotriazole anticorrosive agent (E) include ethylbenzotriazole, benzotriazole butyl ester, benzotriazole methyl ester, chlorobenzotriazole, 1-hydroxymethyl-benzotriazole, 1-(2,3-dihydroxypropyl)-benzotriazole, 1-(1,2-dicarboxyethyl)benzotriazole, 1-[N,N-bis(2-ethylhexyl)-aminomethyl]benzotriazole, 1,2,3-benzotriazole, carboxybenzotriazole, and the like. Among these, 1-[N,N-bis (2-ethylhexyl)aminomethyl]benzotriazole and 1,2,3-benzotriazole are preferred from the standpoint of rust-preventing effect and suitability for a coating composition.

(F) Anticorrosive Pigment

A photocurable coating composition according to the present invention contains an anticorrosive pigment (F) selected from a phosphate anticorrosive pigment and calcium ion-exchanged silica.

As the phosphate anticorrosive pigment, at least one member selected from an aluminum salt, a magnesium salt, a calcium salt, and a zinc salt of phosphoric acid, phosphorous acid, polyphosphoric acid, or phosphomolybdic acid can be used. The calcium ion-exchanged silica is a non-toxic anticorrosive pigment in which calcium ions are incorporated by ion exchange into a silica support having a fine porous structure. Either a phosphate anticorrosive pigment or calcium ion-exchanged silica can be used alone, or both of them can be used in combination.

The mean primary particle diameter of the anticorrosive pigment (F) selected from a phosphate anticorrosive pigment and calcium ion-exchanged silica is preferably at least 1 μm and not greater than 10 μm from the standpoints of dispersibility in the coating composition and the external appearance and transparency of the coating. The mean primary particle diameter can be measured by the electrical resistance method.

In a photocurable coating composition according to the present invention, a benzotriazole anticorrosive agent (E) and an anticorrosive pigment (F) selected from a phosphate anticorrosive pigment and calcium ion-exchanged silica are used in combination. As a result, due to the chelating action of the benzotriazole anticorrosive agent (E) and the sacrificial anodic action of the phosphate anticorrosive pigment (F) and/or the ion exchange action of the calcium ion-exchanged silica, it is possible to form a photocured coating having excellent corrosion resistance which is comparable to that obtained with compound grease or storage grease.

(G) Phosphate Ester

A photocurable composition according to the present invention contains a phosphate ester (G) particularly in order to improve the adhesion of a photocured coating formed therefrom to a substrate.

The phosphate ester (G) is preferably a photocurable compound from the standpoint of maintaining a high level of adhesion to the substrate of the photocured coating for long periods. More preferably, it contains at least one ethylenically unsaturated bond in the molecule. Examples of the phosphate ester (G) include alkyl phosphates which contain at least one ethylenically unsaturated bond in the molecule, aralkyl phosphates which contain at least one ethylenically unsaturated bond in the molecule, allyl phosphate, (meth)acrylates having a phosphate group in the molecule (referred to below as (meth)acrylate phosphates), and the like.

Among these, a (meth)acrylate phosphate is preferred. Examples of a (meth)acrylate phosphate are compounds having the following formula (1) or (2).

(1)

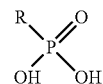

(2)

In formulas (1) and (2), R stands for $CH_2=CR^1—COO—R^2—O—$, $R^1$ stands for H or $CH_3$, and $R^2$ stands for a straight chain or branched alkylene group having 1-4 carbon atoms. In formula (I), the two R's may be the same or different from each other.

By using the (meth)acrylate phosphate of formula (1) or (2), the adhesion of the photocured coating to the substrate is improved due to a reaction between the phosphate group and the surface of the substrate (metal).

Specific examples of the (meth)acrylate phosphate include 2-hydroxy-ethyl (meth)acrylate phosphate (also referred to as 2-(meth)acryloyloxyethyl acid phosphate), (meth)acryloyloxyethyl phosphorylphenyl, EO (ethylene oxide)-modified (meth)acrylate phosphate, EO-modified phenoxylated (meth)acrylate phosphate, EO-modified butoxylated (meth) acrylate phosphate, EO-modified octoxylated (meth)acrylate phosphate, and the like.

Various Additives

In addition to the above-described essential components (A) to (G), a photocurable composition according to the present invention may contain as optional components various additives which are commonly used in the field of coating compositions. Examples of such additives include (H) a lubricant and (I) a fluorescent brightening agent.

Examples of the lubricant (H) include waxes such as polyethylene wax, paraffin wax, and carnauba wax; solid lubricants such as polytetrafluoroethylene (PTFE); and the like. Among these, polyethylene wax is preferred from the standpoints of maintaining lubricating properties over long periods and cost.

A photocurable composition according to the present invention can form a photocured coating having satisfactory lubricating properties even if it does not contain any lubricant (H). However, addition of the lubricant (H) can provide the photocured coating with further improvement in lubricating properties (slipping properties). Therefore, in accordance with the lubricity demanded of the photocured coating, if necessary, the lubricant (H) can be added to the photocurable composition. For example, when the substrate is a threaded joint for steel pipes, it is possible to further improve the lubricity of the threaded joint by addition of the lubricant (H).

The fluorescent brightening agent (I) can be added to a photocurable composition, if necessary, in order to improve the visibility of a photocured coating formed from the composition. Examples of the fluorescent brightening agent (I) include compounds such as benzoxazoles, oxazoles, stilbenes, coumarins, pyrazolines, imidazoles, naphthalimides, bisbenzoxazoles, and bis-styrylbiphenyls; diaminostilbene disulfonic acid derivatives, and the like. Among these, bisbenzoxazole compounds are preferred, and 2,5-thiophenediyl-bis(5-tert-butyl-1,3-benzoxazole), which is the compound represented by the following formula 3, is more preferred.

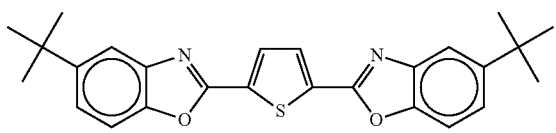

(3)

Proportion of Each Component of a Photocurable Composition

A photocurable composition according to the present invention preferably contains the respective components in proportions within the following ranges, which are indicated in parts by mass, with the sum of components (A) to (G) being 100 parts:

5-50 parts of component (A),
5-50 parts of component (B),
5-30 parts of component (C),
1-15 parts of component (D),
0.1-5 parts of component (E),
1-10 parts of component (F), and
1-5 parts of component (G).

The proportion of each component of a photocurable composition is indicated as its dry solids content (exclusive of the content of solvent, if any). When the content of each of components (A) to (G) is within the above-described range, a photocured coating formed from the composition has a good balance between adhesion to the substrate and corrosion resistance.

A more preferred proportion of each component is in the following range:

20-40 parts of component (A),
20-40 parts of component (B),
10-25 parts of component (C),
3-10 parts of component (D),
0.3-3 parts of component (E),
3-8 parts of component (F), and
2-4 parts of component (G).

From the standpoints of balancing adhesion to the substrate and corrosion resistance, it is also preferred that the content of each of the above components with respect to 1 part of component (C) be in the following range:

0.8-4 parts of component (A),
0.8-4 parts of component (B),
0.1-1 parts of component (D),
0.02-0.3 parts of component (E),
0.12-0.8 parts of component (F), and
0.08-0.4 parts of component (G).

When a photocurable composition according to the present invention contains a lubricant (H), the content of the lubricant (H) is preferably 0.1-5 percent by mass and more preferably 0.1-3 percent by mass based on the total amount of the photocurable composition. In addition, the lubricant (H) is preferably used in an amount of 0.1-10 parts and more preferably 0.1-5 parts by mass with respect to 100 parts of the total amount of components (A)-(G) in the photocurable composition. If the content of the lubricant (H) is too low, when the photocurable composition is applied to a threaded joint for steel pipes and cured to form a rust-preventing coating, the desired further improvement in the lubricity (lubricating properties) of the threaded joint may not be achieved. If the content of the lubricant (H) is too high, it can result in inadequate curability and a decrease in the adhesion between the coating and a substrate.

When a photocurable composition contains a fluorescent brightening agent (I), its content is preferably 0.1-3 percent by mass and more preferably 0.1-1 percent by mass based on the total amount of the photocurable composition. In addition, the fluorescent brightening agent (I) is preferably used in an amount of 0.1-5 parts and more preferably 0.1-3 parts by mass with respect to 100 parts of the total of components (A)-(G) in the photocurable composition. If the content of the fluorescent brightening agent (I) is too low, the intended effect of adding the fluorescent brightening agent (I) may not be sufficiently exhibited. If the content of this component is too high, it sometimes leads to poor curability and a decrease in adhesion between the coating and a substrate.

[Formation of a Rust-Preventing Coating on a Threaded Joint for Steel Pipes]

A photocurable composition according to the present invention can be suitably used as a material for forming a rust-preventing coating on a threaded joint for steel pipes (referred to below simply as a coating composition). By using this coating composition, a rust-preventing coating having excellent corrosion resistance and excellent adhesion with respect to a substrate in the form of a threaded joint for steel pipes can be formed.

In this case, the photocurable composition may contain, in addition to the above-described components, small amounts (e.g., at most 10% by mass of the overall composition) of additives which have conventionally been used in a coating composition as optional components as long as they do not have a significant adverse action on the objects and effects of the present invention. It is expected that these additives may further improve the performance and quality of the photocurable composition as a coating composition.

Examples of the additives which can be used include an amine- or quinone-type photopolymerization promoter, a thermal polymerization inhibitor, an inorganic filler, an organic filler, an adhesion imparting agent, a thixotropic agent, a plasticizer, a nonreactive polymer, a coloring pigment, an anti-settling agent, an antifoaming agent, a leveling agent, and the like.

If desired, an anticorrosive agent other than the benzotriazole anticorrosive agent (E) and the anticorrosive pigment (F) selected from a phosphate anticorrosive pigment and calcium ion-exchanged silica may be added as long as it does not markedly increase the turbidity of the coating or markedly decrease the coating curability. Examples of such an anticorrosive agent include molybdic acid calcium or aluminum salt, boric acid barium or calcium salt, calcium silicate, calcium borosilicate, and the like.

[Method of Preparing a Photocurable Composition or a Coating Composition]

A photocurable composition and a coating composition according to the present invention can be prepared in a conventional manner. For example, the above-described components which have been weighed to give proportions in the above-described ranges can be mixed and dispersed using a dispersion mixer such as a ball mill, a bead mill, or a three-roll mill, or a stirring mixer such as a high speed rotating blade mixer called a disper mixer to prepare the above-described photocurable composition or coating composition.

A photocurable composition and a coating composition according to the present invention does not substantially contain and does not need to contain powders of heavy metals such as zinc, lead, or copper which are contained in large amounts in a conventional rust-preventing coating for a threaded joint for steel pipes. Therefore, adverse effects of these powders on the environment and humans can be avoided when forming or using a photocured coating.

[Substrate to be Coated]

Examples of substrates which can be coated with a photocurable composition and a coating composition according to the present invention include plates or sheets, wires, rods, pipes, and various other metal substrates (shaped members). Examples of metals which constitute the above-described substrates are various metals such as iron, carbon steel, copper, zinc, tin, and aluminum; and alloys of these metals. The substrate may be a material plated with such a metal or alloy. Since a photocurable composition and a coating composition according to the present invention can form a coating having excellent corrosion resistance, they are particularly suited for carbon steel and alloy steels having a Cr content of at most 20 mass percent. A photocurable composition and a coating-forming material according to the present invention can also be applied to the above-described various substrates (shaped members) and used for applications other than rust prevention.

Among these uses, a photocurable composition and a coating composition according to the present invention are suitable for use to form a coating intended for rust prevention or rust prevention and lubrication on a threaded joint for pipes and particularly on the pin and/or the box of a threaded joint for steel pipes.

[Photocured Coating, Substrate with a Photocured Coating, and Threaded Joint for Steel Pipes Having a Photocured Coating]

A photocured coating according to the present invention is formed from the above-described photocurable composition. The photocured coating is usually formed on the above-described substrate (such as the contact surfaces of a threaded joint for steel pipes). The method for its formation is as described later.

A substrate having a photocured coating according to the present invention has the above-described photocured coating on a surface of a metal substrate.

A threaded joint for steel pipes having a photocured coating according to the present invention is characterized by having the above-described photocured coating on the surface of a pin and/or a box of a threaded joint for steel pipes. The photocured coating has excellent corrosion resistance and adhesion to a substrate in the form of the threaded joint for pipes.

The thickness of the photocured coating is normally in the range of 1-100 micrometers. Taking into consideration the cost for rust prevention, corrosion resistance, ease of makeup, and the curing efficiency of the photocurable composition, the coating thickness is preferably 5-30 micrometers.

The photocured coating has good adhesion to a substrate (such as the contact surfaces of a threaded joint for steel pipes). For example, the photocurable composition does not peel off a substrate even if there is an external impact at the time of transport or handling or contact with a roll skid or the like. The photocurable composition also has excellent corrosion resistance (rust-preventing properties).

A photocured coating according to the present invention is highly transparent, so it is possible to optically inspect threaded portions of a threaded joint for damage from above the coating. Specifically, the turbidity of the photocured coating is preferably at most 40% and more preferably at most 15%. As the turbidity increases, the transparency decreases, and it sometimes becomes difficult to ascertain whether there is damage to threaded portions. The lower the turbidity of the photocured coating the better. The lower limit of the turbidity is usually 0.1%. A method of measuring turbidity is described in the following example.

The turbidity of the photocured coating can be adjusted by the proportions of pigment components such as an anticorrosive pigment (such as the anticorrosive pigment (F) selected from a phosphate anticorrosive pigment and calcium ion-exchanged silica) and the lubricant (H). The turbidity increases as the proportions of these components increase.

[Method for Rust Prevention of a Threaded Joint for Steel Pipes and Method of Manufacturing a Threaded Joint for Steel Pipes Having a Photocured Coating]

A method for rust prevention of a threaded joint for steel pipes according to the present invention (a method of surface treatment for rust prevention) comprises the steps of applying the above-described photocurable composition to the surfaces of a pin and/or a box of a threaded joint for steel pipes and then irradiating the coated surfaces with active energy rays to cure the composition and form a photocured coating.

A method of manufacturing a threaded joint for steel pipes having a photocured coating according to the present invention comprises the steps of applying the above-described photocurable composition to the surfaces of a pin and/or a box of a threaded joint for steel pipes and then irradiating the coated surfaces with active energy rays to cure the composition and form a photocured coating.

The contact surfaces of the threaded joint for pipes (the surfaces of the threaded portions and the unthreaded metal contact portions of the pin and/or the box of the threaded joint) can be irradiated with active energy rays immediately after the application of the above-described photocurable composition, and the composition as a whole is rapidly cured by photopolymerization, thereby forming a coating with uniform degree of cross linking. This uniform coating has good adhesion to the surface of a steel pipe and can effectively prevent the formation of rust.

Prior to applying the photocurable composition, the surface of the steel pipe may be subjected to chemical conversion treatment known in the art such as oxalate or phosphate chemical conversion treatment to form a primary or undercoating as a means for assisting in rust prevention and improving the adhesion of the coating. The surface may also be subjected to surface roughening treatment known in the art such as shot blasting and shot peening for the purpose of improving the adhesion of the coating. In addition, it is preferable to adequately remove moisture and oil remaining on the surface of the steel pipe prior to application of the photocurable composition. As long as the object and effects of they present invention are not impaired, a conventional known lubricant may be applied atop the photocured coating, or a conventional known lubricating coating or anticorrosive coating may be formed atop the photocured coating.

Spraying, showering, dipping, roll application, or the like can be used as a method of applying the photocurable composition and the coating composition to form a rust-preventing coating on a threaded joint for steel pipes.

As a source of active energy rays, it is convenient to use a device capable of generating ultraviolet light such as an (ultra) high pressure mercury lamp or a metal halide lamp, but it is also possible to use an electron beam accelerator, cobalt 60 as a source of gamma rays, or the like. It is convenient to use a "continuous coating system to form a rust-preventing coating on a threaded joint for pipes" in which a steel pipe which is being transported by rollers is successively subjected to application of the photocurable composition and irradiation with active energy rays.

EXAMPLES

The present invention will be explained by the following examples but the present invention is not limited to these examples. In the following examples and comparative examples, unless otherwise specified, "parts" means parts by mass.

[Methods for Measuring Tg, Mn, and Viscosity of a Photocurable (Meth)Acrylate Resin]

Tg: Measured with a differential scanning calorimeter (DSC) in accordance with JIS K7121;
Mn: Measured by gel permeation chromatography (GPC);
Viscosity: Measured with a Brookfield viscometer in accordance with JIS K7117-2.

Example 1

In order to prepare the composition shown in Table 1, the following components (100 parts in total) were added to a vessel in appropriate order and stirred using a disper mixer into a uniform mixture to form a photocurable composition:

20 parts of a photocurable acrylate resin (SHIKO™ UV3200B, Nippon Synthetic Chemical Industry Co., Ltd.),
20 parts of a photocurable acrylate resin (RIPDXY™ VR-77-80TPA, Showa Highpolymer Co., Ltd.),
8 parts of a monofunctional acrylate monomer (FANCRYL™ FA-512A, Hitachi Chemical Co., Ltd.),
13 parts of a difunctional monomer (TPGDA, Daicel-Cytec Co., Ltd.),
5 parts of a difunctional monomer (VISCOAT™ #215, Osaka Organic Chemical Industry Ltd.),
15 parts of a trifunctional monomer (NEW FRONTIER™ TMPT, Dai-ichi Kogyo Seiyaku, Co., Ltd.),
7 parts of a photopolymerization initiator (IRGACURE™ 184, Ciba Specialty Chemicals),
3 parts of a photopolymerization initiator (IRGACURE™ 651, Ciba Specialty Chemicals),
1 part of a benzotriazole anticorrosive agent (BT-LX, Johoku Chemical Co., Ltd.),
5 parts of a phosphate anticorrosive pigment (EXPERT™ NP-1102, Toho Ganryo Kogyo Co. Ltd.), and
3 parts of a phosphate ester (LIGHTESTER™ P-2M, Kyoeisha Chemical Co. Ltd.).

Using the photocurable composition, the following evaluations 1-4 were performed. The results are shown in Table 2.

Examples 2-10 and Comparative Examples 1-6

Photocurable compositions were prepared in the same manner as in Example 1 except that the components shown in Table 1 were used in the indicated proportions. The following evaluations 1-4 were carried out on each of the resulting photocurable compositions. The results are shown in Table 2.

The details of each of the components shown in Table 1 were as follows.

[Components (A): Photocurable (Meth)Acrylate Resins]
A-1: a polyurethane acrylate from Nippon Synthetic Chemical Industry Co., Ltd.: SHIKO™ UV3200B, Tg=−8° C., Mn=10,000, viscosity=50,000 mPa-sec (25° C.);
A-2: a polyester acrylate from DIC Corp.: UNIDIC™ V3021, Mn=500, viscosity=7,000 mPa-sec (25° C.);
A-3: a polyester acrylate from Daicel-Cytec Co., Ltd.: EBECRYL™ 525, Mn=1000, viscosity=40,000 mPa-sec (25° C.);
A-4: a polyester acrylate from Daicel-Cytec Co., Ltd.: EBECRYL™ 811, viscosity=1850 mPa-sec (60° C.);
A-5: an epoxy acrylate from DIC Corp.: UNIDIC™ V5502, Tg=from 100-140° C., Mn=1300, viscosity=2000 mPa-sec (25° C.);
A-5: an epoxy acrylate from Showa Highpolymer Co., Ltd.: RIPDXY™ VR-77-80TPA, Mn=500, viscosity=40,000 mPa-sec (25° C.).

[Components (B): Monofunctional or Difunctional (Meth)Acrylate Monomers]
B-1: a monofunctional acrylate monomer—dicyclopentenyloxyethyl acrylate from Hitachi Chemical Co., Ltd.: FANCRYL™ FA-512A;
B-2: a monofunctional acrylate monomer—phenoxyethyl acrylate from Dai-ichi Kogyo Seiyaku Co., Ltd.: NEW FRONTIER™ PHE;
B-3: a difunctional acrylate monomer—tripropylene glycol diacrylate from Daicel-Cytec Co., Ltd.: TPGDA;
B-4: a difunctional acrylate monomer—neopentylglycol diacrylate from Osaka Organic Chemical Industry, Ltd.: VISCOAT™ #215;
B-5: a difunctional acrylate monomer—1,6-hexanediol diacrylate from Dai-ichi Kogyo Seiyaku Co., Ltd: NEW FRONTIER™ HDDA.

[Components (C): Trifunctional or Higher Multifunctional (Meth)Acrylate Monomers]
C-1: a trifunctional acrylate monomer—trimethylolpropane triacrylate from Dai-ichi Kogyo Seiyaku Co., Ltd: NEW FRONTIER™ TMPT;
C-2 a trifunctional acrylate monomer—pentaerythritol triacrylate from Dai-ichi Kogyo Seiyaku Co., Ltd.: NEW FRONTIER™ PET-3.

[Components (D): Photopolymerization Initiators]
D-1: 1-hydroxycyclohexyl phenyl ketone from Ciba Specialty Chemicals: IRGACURE™ 184;
D-2: 2,2-dimethoxy-2-phenylacetophenone from Ciba Specialty Chemicals: IRGACURE™ 651.

[Component (E): a Benzotriazole Anticorrosive Agent]
E-1: 1-[N,N-bis(2-ethylhexyl)aminomethyl]benzotriazole from Johoku Chemical Co., Ltd.: BT-LX.

[Components (F): Anticorrosive Pigments]
F-1: a phosphate anticorrosive pigment—aluminum phosphite from Toho Ganryo Co., Ltd.: EXPERT™ NP-1102;
F-2: calcium ion-exchanged silica (amorphous silicon dioxide and calcium hydroxide) from Fuji Silysia Chemical Ltd.: SYLOMASK™ 55.

[Component (G): Phosphate Ester]
G-1: 2-methacryloyloxyethyl acid phosphate from Kyoeisha Chemical Co., Ltd.: LIGHTESTER™ P-2M.

[Component (H): Lubricant]
H-1: micronized polyethylene wax from BYK Chemie: CERAFLOUR™ 991

[Component (I): Fluorescent Brightening Agent]
I-1: Fluorescent brightening agent-2,5-thiophenediyl-bis (5-tert-butyl-1,3-benzoxazole from Ciba Specialty Chemicals: TINOPAL™ OB.

TABLE 1

| Photocurable composition (numerals in examples indicate content in mass %) | | | Examples | | | | | | | |
| --- | --- | --- | --- | --- | --- | --- | --- | --- | --- | --- |
| Component | Symbol | Chemical Name | 1 | 2 | 3 | 4 | 5 | 6 | 7 | 8 |
| (A) Photocurable (meth)acrylate resin | A-1 | Polyurethane acrylate | 20 | | | | | 15 | 20 | 15 |
| | A-2 | Polyester acrylate | | 25 | | | | 20 | | |

TABLE 1-continued

| Component | | Symbol | Chemical Name | Ex1 | Ex2 | Ex3 | Ex4 | Ex5 | Ex6 | Ex7 | Ex8 |
|---|---|---|---|---|---|---|---|---|---|---|---|
| | | A-3 | Polyester acrylate | | | | | 36 | 20 | | |
| | | A-4 | Polyester acrylate | | | | | 35 | | | |
| | | A-5 | Epoxy acrylate | | 13 | | | 20 | | | |
| | | A-6 | Epoxy acrylate | 20 | | | | | 15 | 10 | 15 | 15 |
| (B) Mono- and di- | Mono | B-1 | Dicyclopentenyloxyethyl acrylate | 8 | | 32 | | | 20 | 8 | 8 |
| functional | | B-2 | Phenoxyethyl acrylate | | 15 | | | 10 | | | |
| (meth)acrylate | Di | B-3 | Tripropylene glycol diacrylate | 13 | | | 30 | | | 13 | 13 |
| monomer | | B-4 | Neopentylglycol diacrylate | 5 | 15 | | | | | 5 | 5 |
| | | B-5 | 1,6-Hexanediol diacrylate | | | 3 | | 10 | | | |
| (C) Trifunctional or higher | | C-1 | Trimethylolpropane triacrylate | 15 | | | | 6 | 15 | 15 | 15 | 15 |
| multifunctional (meth)acrylate | | C-2 | Pentaerythritol triacrylate | | | 10 | 13 | | | | |
| monomer | | | | | | | | | | | |
| (D) Photopolymerization | | D-1 | 1-Hydroxycyclohexyl phenyl ketone | 7 | 7 | 7 | 7 | 7 | 7 | 7 | 7 |
| intiator | | D-2 | 2,2-dimethoxy-2-phenylacetophenone | 3 | 3 | 3 | 3 | 3 | 3.5 | 3 | 3 |
| (E) Benzotriazole | | E-1 | 1-[N,N-bis(2-ethylhexyl)aminomethyl]-benzotriazole | 1 | 1 | 1 | 1 | 1 | 1 | 1 | 1 |
| anticorrosive agent | | | | | | | | | | | |
| (F) | Phosphate | F-1 | Aluminum phosphite | 5 | 5 | 5 | 5 | 5 | 5 | 10 | 15 |
| Anticorrosive | Ca | F-2 | Amorphous silicon dioxide, calcium hydroxide | | | | | | | | |
| pigment | exchanged silica | | | | | | | | | | |
| (G) Phosphate ester | | G-1 | 2-methacryloyloxyethyl acid phosphate | 3 | 3 | 3 | 3 | 3 | 3 | 3 | 3 |
| (H) Lubricant | | H-1 | Micronized polyethylene wax | | | | | | 1 | | |
| (I) Fluorescent whitening agent | | I-1 | 2,5-thiophenediylbis(5-tert-butyl-1,3-benzoxazole) | | | | | | | 0.5 | |
| Total | | | | 100 | 100 | 100 | 100 | 100 | 100 | 100 | 100 |

| Photocurable composition (numerals in examples indicate content in mass %) | | | | Examples | | Comparative Examples | | | | | |
|---|---|---|---|---|---|---|---|---|---|---|---|
| Component | | Symbol | Chemical Name | 9 | 10 | 1 | 2 | 3 | 4 | 5 | 6 |
| (A) Photocurable | | A-1 | Polyurethane acrylate | | | | 35 | 35 | 21 | 25 | 23 |
| (meth)acrylate resin | | A-2 | Polyester acrylate | 20 | | | | | | | |
| | | A-3 | Polyester acrylate | | 35 | | | | | | |
| | | A-4 | Polyester acrylate | | | | | | | | |
| | | A-5 | Epoxy acrylate | | | | 31 | 20 | 20 | 20 | 20 |
| | | A-6 | Epoxy acrylate | 15 | | | | | | | |
| (B) Mono- and di- | Mono | B-1 | Dicyclopentenyloxyethyl acrylate | 26 | 30 | 8 | | 8 | 8 | 8 | 8 |
| functional | | B-2 | Phenoxyethyl acrylate | | | 13 | | | | | |
| (meth)acrylate | Di | B-3 | Tripropylene glycol diacrylate | | | 20 | | 13 | 13 | 13 | 13 |
| monomer | | B-4 | Neopentylglycol diacrylate | | | 5 | | 5 | 5 | 5 | 5 |
| | | B-5 | 1,6-Hexanediol diacrylate | | | | | | | | |
| (C) Trifunctional or higher | | C-1 | Trimethylolpropane triacrylate | | | 15 | 15 | | 15 | 15 | 15 |
| multifunctional (meth)acrylate | | C-2 | Pentaerythritol triacrylate | 15 | 15 | 20 | | | | | |
| monomer | | | | | | | | | | | |
| (D) Photopolymerization | | D-1 | 1-Hydroxycyclohexyl phenyl ketone | 7 | 7 | 7 | 7 | 7 | 7 | 7 | 7 |
| intiator | | D-2 | 2,2-dimethoxy-2-phenylacetophenone | 3 | 3.5 | 3 | 3 | 3 | 3 | 3 | 3 |
| (E) Benzotriazole | | E-1 | 1-[N,N-bis(2-ethylhexyl)aminomethyl]-benzotriazole | 1 | 1 | 1 | 1 | 1 | | 1 | 1 |
| anticorrosive agent | | | | | | | | | | | |
| (F) | Phosphate | F-1 | Aluminum phosphite | 5 | | 5 | 5 | 5 | 5 | | 5 |
| Anticorrosive | Ca | F-2 | Amorphous silicon dioxide, calcium hydroxide | 5 | 5 | | | | | | |
| pigment | exchanged silica | | | | | | | | | | |
| (G) Phosphate ester | | G-1 | 2-methacryloyloxyethyl acid phosphate | 3 | 3 | 3 | 3 | 3 | 3 | 3 | |
| (H) Lubricant | | H-1 | Micronized polyethylene wax | | | | | | | | |
| (I) Fluorescent whitening agent | | I-1 | 2,5-thiophenediylbis(5-tert-butyl-1,3-benzoxazole) | | 0.5 | | | | | | |
| Total | | | | 100 | 100 | 100 | 100 | 100 | 100 | 100 | 100 |

[Testing Methods for Evaluation]

1. Evaluation of Corrosion Resistance (Salt Spray Test)

The corrosion resistance of the photocurable compositions obtained in the examples and comparative examples was evaluated in the following manner in accordance with the salt spray test described in JIS Z2371.

First, each of the above-described photocurable compositions was applied by spraying it atop a steel sheet so that the coating thickness of the resulting photocured coating would be 20 micrometers±1 micrometer, then it was irradiated with ultraviolet light to cure the applied coating and obtain a steel sheet with a photocured coating. As the steel sheet, a carbon steel sheet (SPCC-SD, 150 mm×70 mm×0.8 mm) which had been treated with a zinc phosphating solution (Paltec Test Panels Co. Ltd.) so as to form a phosphate layer with a thickness of about 1 micrometer (hereinafter referred to as a zinc phosphated steel sheet) was used. An air sprayer manufactured by Nordson K.K was used as a spraying device. Curing with ultraviolet rays was carried out by ultraviolet ray irradiation using an ultraviolet ray irradiation apparatus manufactured by Eye Graphics Co., Ltd. under the condition of 1000 mJ/cm$^2$ (measured with an illuminometer manufactured by TOPCON Corporation). The thickness of the photocured coating which was formed was ascertained using an electromagnetic film thickness meter manufactured by Kett Electric Laboratory.

A salt spray test was carried out on the resulting steel sheet with a photocured coating (Test Piece 1). The salt spray test was carried out using a testing machine manufactured by Suga Test Instruments Co., Ltd. Test Piece 1 was removed in order to examine it for the presence or absence of rust after the passage of 100 hours, 200 hours, 500 hours, 750 hours, and 1000 hours. The criterion for the occurrence of rust was that there was rust if even one dot-shaped area of rust was observed. Test pieces which did not have any rust after 750 hours (Score A or B in the following criterion for evaluation) were considered acceptable.

Criterion for evaluation of corrosion resistance:
A: No rust observed after 1000 hours,
B: No rust observed after 750 hours,
C: No rust observed after 500 hours,
D: Occurrence of rust before 500 hours.

2. Evaluation of the Adhesion of the Photocured Coating to a Substrate Before and after a Heat Cycle Test The steel sheets used in this test were the above-described zinc phosphated steel sheet and a stainless steel sheet having a Cr content of 13 mass percent which had been finished by grinding (150 mm×70 mm×2 mm). The photocurable compositions obtained in the examples and the comparative examples were applied by spraying to the steel sheets, and then they were irradiated with ultraviolet rays to cure the applied coating and obtain steel sheets with a photocured coating. The conditions for application and curing were the same as the conditions for to above-described Test 1 (evaluation of corrosion resistance). Cross-shaped slits with a length of 20 mm were made to a depth that reached the steel substrate in the photocured coating using a cutting knife to create a condition in which peeling could easily progress.

Using Test Piece 2 obtained in the above manner, (1) adhesion of the photocured coating to a substrate before a heat cycle test, and (2) adhesion of the photocured coating to a substrate after a heat cycle test were evaluated.

(1) Before the heat cycle test: Adhesion was evaluated using a typical tape peeling test based on JIS K5600. Only test pieces having Score 1 or 0 (Score A or B in the following criterion for evaluation) were evaluated as acceptable in accordance with the evaluation standards set forth in JIS K5600.

Criterion for evaluation of adhesion before a heat cycle test
A: Score 0 in the tape peeling test based on JIS K5600,
B: Score 1 in the tape peeling test based on JIS K5600,
C: Score 2 in the tape peeling test based on JIS K5600,
D: Score 3 or poorer in the tape peeling test based on JIS K5600.

(2) After the heat cycle test: A heat cycle test was performed by placing the above-described Test Piece 2 into a thermostat and carrying out 20 cycles of holding it in an environment at 80° C. and 30% relative humidity for 16 hours and then holding it for 8 hours at a temperature of −45° C. The percent of peeled area of the photocured coating was measured after the test. Only test pieces for which the percent of area peeled from the slits was less than 5% (Score A or B in the following criterion for evaluation) were considered acceptable.

Criterion for evaluation of adhesion after a heat cycle test
A: No peeling from the slits after the heat cycle test,
B: Less than 5% of area peeled from the slits after the heat cycle test,
C: At least 5% and less than 10% of area peeled from the slits after the heat cycle test,
D: At least 10% of area peeled from the slits after the heat cycle test.

3. Method of Measuring Turbidity

The photocurable compositions obtained in the examples and comparative examples were applied using a film applicator to a biaxially oriented PET (polyethylene terephthalate) film so that the film thickness after curing would be 25 micrometers. The applied coatings were then irradiated with infrared rays to obtain a photocured coating. The turbidity of the coated film having this photocured coating was measured using a haze meter (NDH2000, Nippon Denshoku Industries Co., Ltd., light source: halogen lamp rated at 5 V and 9 W (incident aperture diameter of 20 mm)).

4. Evaluation of Lubricating Properties (Coefficient of Friction)

In order to evaluate the lubricating properties (coefficient of friction) of the coating surface, a commercially available Bowden friction tester (Shinko Engineering Co., Ltd.) was used. In the Bowden friction tester, a steel ball was moved back and forth in a straight line on a coating formed on a steel sheet while a load was applied to the ball. The coefficient of friction was measured from the frictional force and the pressing load at that time.

The specific procedure was as follows. First, a photocurable composition obtained in the examples or comparative examples was applied atop the zinc phosphated steel sheet with a bar coater so that the coating thickness of the photocured coating would be 20 micrometers±1 micrometer, then it was irradiated with ultraviolet rays to cure the coating and obtain a steel sheet with a photocured coating. The curing conditions were the same as the conditions in above-described Test 1 (evaluation of corrosion resistance). The resulting test pieces were cut to a size of 100 mm×20 mm and placed on the Bowden friction tester. A commercially available steel ball made of SUJ2 steel with an outer diameter of 3/16 inches (Amatsuji Steel Ball Manufacturing Co., Ltd.) which had been adequately degreased was used as the steel ball in the Bowden friction test. The steel ball was moved back and forth 30 times with a pressing load of 1 kgf, a sliding speed of 4 mm/sec, and a sliding width of 10 mm, and the average coefficient of friction was determined. Lubricating properties were evaluated using a coefficient of friction of 0.2 as a standard. It was determined that a coefficient of friction of 0.2 or below indicated good lubricating properties.

TABLE 2

| Test Item | | Test Piece | Examples | | | | | | | | | | Comparative Examples | | | | | |
|---|---|---|---|---|---|---|---|---|---|---|---|---|---|---|---|---|---|---|
| | | | 1 | 2 | 3 | 4 | 5 | 6 | 7 | 8 | 9 | 10 | 1 | 2 | 3 | 4 | 5 | 6 |
| Corrosion resistance | | Zinc phosphated steel sheet | B | B | B | B | A | B | A | A | A | A | C | C | C | D | D | C |
| Adhesion | Before heat cycle test | Zinc phosphated steel sheet | A | A | A | A | A | A | A | A | A | A | C | C | C | B | B | D |
| | | Stainless steel sheet | A | A | A | A | A | A | B | A | A | A | D | D | D | C | C | D |

TABLE 2-continued

|  |  | Examples | | | | | | | | | | Comparative Examples | | | | | |
| --- | --- | --- | --- | --- | --- | --- | --- | --- | --- | --- | --- | --- | --- | --- | --- | --- | --- |
| Test Item | Test Piece | 1 | 2 | 3 | 4 | 5 | 6 | 7 | 8 | 9 | 10 | 1 | 2 | 3 | 4 | 5 | 6 |
| After heat cycle test | Zinc phosphated steel sheet | A | A | A | A | A | A | B | A | A | A | C | C | C | B | B | D |
|  | Stainless steel sheet | A | A | A | A | A | A | B | A | A | A | D | D | D | C | C | D |
| Turbidity (%) | — | 10 | 10 | 10 | 10 | 14 | 10 | 25 | 35 | 25 | 10 | 10 | 10 | 10 | 10 | 1 | 10 |
| Lubricating properties (Friction coeefficient) | Zinc phosphated steel sheet | 0.13 | 0.14 | 0.14 | 0.13 | 0.08 | 0.14 | 0.16 | 0.17 | 0.13 | 0.12 | 0.29 | 0.31 | 0.33 | 0.5 | 0.3 | 0.26 |

Corrosion resistance: A = No rust after 1000 hr, B = No rust after 750 hr, C = No rust after 500 hr, D = Rust observed before 500 hr.
Adhesion before heat cycle test (Score of tape peeling, JIS K5600): 0 = A, 1 = B, 2 = C, 3 or more = D
Adhesion after heat cycle test (% peeled area from slits): 0% = A, less than 5% = B, from 5% to less than 10% = C, 10% or more = D As shown in Table 2, in each of Examples 1-10, there was no formation of rust after 750 or more hours in the salt spray test, and it was determined that corrosion resistance was acceptable. The adhesion to substrates evaluated in the tape peeling test was 0 or 1 by the evaluation standard of JIS, so the adhesion to a substrate before the heat cycle test was evaluated as acceptable. The adhesion to a substrate after the heat cycle test was a peeling area percentage from slits of less than 5%, so the adhesion to the substrate after the heat cycle test was evaluated as acceptable. In each of Examples 1-8, the coefficient of friction using a Bowden friction tester was at most 0.2, so the lubricating properties were evaluated as acceptable.

In contrast, in all of Comparative Examples 1-6, rust developed by 500 hours or 750 hours in the salt spray test, so corrosion resistance was evaluated as unacceptable. The adhesion to the substrate evaluated by the tape peeling test and the adhesion to the substrate after the heat cycle test was unacceptable except for Comparative Examples 4 and 5 in which the substrate was a zinc phosphated steel sheet. In particular, the adhesion to a stainless steel sheet was extremely poor. In each of Comparative Examples 1-6, the coefficient of friction in the Bowden friction test was at least 0.2, so the lubricating properties were evaluated as poor.

5. Actual Performance Test (5-1) In order to confirm the performance of a photocured coating according to the present invention on an actual threaded joint for steel pipes, coating treatment was carried out in the following manner using the photocurable compositions obtained in Examples 5 and 10 on the surface including the male threads of a threaded joint which was formed on the outer surface at the end of a carbon steel pipe for use as an oil country tubular good (VAMTOP™) having an outer diameter of 13⅜ inch.

After a zinc phosphate coating was formed with a thickness of 8 micrometers (using a zinc phosphating solution from Nihon Parkerizing Co., Ltd.: Palbond 181X) on the outer surface including the male threads (pin surface) at the end of the steel pipe, the photocurable composition was applied by spraying while rotating the steel pipe on turning rollers and moving a spray nozzle in the axial direction. Irradiation with ultraviolet rays was then carried out while rotating the steel pipe to cure the applied coating. A small steel sheet was attached to the steel pipe at a location near the threaded portion, the threaded portion and the steel sheet were simultaneously coated, and the coating conditions were adjusted so that the thickness of the photocured coating on the steel sheet was 25 micrometers. The curing conditions were the same as the conditions when forming the test piece of above-described Test 1 (evaluation of corrosion resistance), and the cumulative irradiation was 1000 mJ/cm². The other conditions were as indicated in 5-2 described below.

A steel pipe having a photocured coating obtained in this manner was left outdoors for at least 3 months near the seashore in an equatorial region having a high temperature and high humidity, and it was left for at least 3 months in winter outdoors near the seashore in northern Europe where the winter is extremely cold. In both cases, it was confirmed that there was no rust or peeling of the coating.

(5-2) A makeup and breakout test of a threaded joint for oil country tubular goods was also carried out. A photocured coating was formed on a surface including the male threads on the pin of a threaded joint formed on the outer surface at the end of a steel pipe, and a solid lubricating coating was formed on a surface including the female threads of the mating box (formed on the inner surface of a coupling). As steel pipes for oil country tubular goods, steel pipes made of carbon steel or 13 Cr steel having a diameter of 3½ inches, 7 inches, 9⅝ inches, or 13⅜ inches were used. The thread shape was VAM-TOP (trademark).

In the case of the carbon steel, coating treatment was carried out in the following manner on the surfaces of a pin and a box.

The surface including the male threads of a pin was first treated by immersion in a zinc phosphating solution (the same as used in test 5-1 described above) at 75-85° C. to form a zinc phosphate coating with a thickness of 8 micrometers. Then a coating composition comprising the photocurable composition obtained in Example 5 or 10 was applied by spraying atop the zinc phosphate coating in the same manner as described in 5-1, and the coating composition was irradiated with ultraviolet rays to cure the applied coating and form a cured coating with a thickness of 25 micrometers. The curing conditions were cumulative irradiation of 1000 mJ/cm², UV lamp: air-cooled mercury lamp, UV lamp output: 4 kW, wavelength of ultraviolet rays: 260 nm.

The surface including the female threads of a box was first treated by Ni strike plating and then by Cu—Sn—Zn alloy plating, both done by electroplating, to form a plated coating with a total thickness of 8 micrometers. A composition for forming a solid lubricating coating having the below-described composition was heated at 120° C. to obtain a molten state, and then the molten composition was applied by spraying atop the plated coating on the box which was preheated to 120° C. to form a solid lubricating coating with a thickness of 50 micrometers.

The composition of the solid lubricating coating-forming composition (on mass % basis) was as follows.

9% of polyethylene homopolymer (LICOWAX™ PE 520 of CLARIANT)

15% of carnauba wax

15% of zinc stearate

5% of liquid polyalkyl methacrylate (IVSCOPLEX™ 6-950 of ROHMAX)

40% of corrosion suppressant (NA-SUL™ Ca/W1935 of King Industries, Inc.)

3.5% of graphite fluoride

1% of zinc oxide

5% of titanium dioxide

5% of bismuth trioxide

1% of silicone (polydimethyl siloxane), and 0.3% of IRGANOX™ and 0.2% of IRGAFOS™ as antioxidants (both of Ciba-Geigy).

In the case of the 13 Cr steel, a photocured coating was formed on the surface including the male threads of the pin without forming a zinc phosphate coating. The conditions were otherwise the same as for the carbon steel.

Makeup and breakout were repeated 10 times using a threaded joint having a pin and a box which had undergone the above-described surface treatment. During the initial stage of makeup, it was ascertained that there was no damage to the threaded portions due to cross threading. In addition, it was confirmed that galling did not develop and lubricating properties did not worsen during 10 cycles of makeup and breakout.

The invention claimed is:

1. A photocurable composition consisting essentially of:
   (A) a photocurable (meth)acrylate resin,
   (B) a (meth)acrylate monomer selected from a monofunctional (meth)acrylate monomer and a difunctional (meth)acrylate monomer, said monofunctional (meth)acrylate monomer being selected from the group consisting of 2-ethylhexyl (meth)acrylate, phenoxyethyl (meth)acrylate, ethoxyethyl (meth)acrylate, butoxyethyl (meth)acrylate, 2-hydroxypropyl (meth)acrylate, methyltriglycol (meth)acrylate, isodecyl (meth)acrylate, isobornyl (meth)acrylate, dicyclopentanyl (meth)acrylate, dicyclopentenyloxyethyl (meth)acrylate, and lauryl (meth)acrylate,
   (C) a trifunctional or higher multifunctional (meth)acrylate monomer,
   (D) a photopolymerization initiator,
   (E) a benzotriazole anticorrosive agent,
   (F) an anticorrosive pigment selected from a phosphate anticorrosive pigment and calcium ion-exchanged silica, and
   (G) a phosphate ester.

2. A photocurable composition as set forth in claim 1 wherein the phosphate ester (G) is a (meth)acrylate having a phosphate group in the molecule.

3. A photocurable composition as set forth in claim 1 wherein the photocurable (meth)acrylate resin (A) is at least one member selected from polyester (meth)acrylate, epoxy (meth)acrylate, polyether (meth)acrylate, and polyurethane (meth)acrylate.

4. A photocurable composition as set forth in claim 1 containing, in mass parts, 5-50 parts of component (A), 5-50 parts of component (B), 5-30 parts of component (C), 1-15 parts of component (D), 0.1-5 parts of component (E), 1-10 parts of component (F), and 1-5 parts of component (G), wherein the total of components (A)-(G) is 100 parts by mass.

5. A photocurable composition consisting essentially of:
   (A) a photocurable (meth)acrylate resin,
   (B) a (meth)acrylate monomer selected from a monofunctional (meth)acrylate monomer and a difunctional (meth)acrylate monomer, said monofunctional (meth)acrylate monomer being selected from the group consisting of 2-ethylhexyl (meth)acrylate, phenoxyethyl (meth)acrylate, ethoxyethyl (meth)acrylate, butoxyethyl (meth)acrylate, 2-hydroxypropyl (meth)acrylate, methyltriglycol (meth)acrylate, isodecyl (meth)acrylate, isobornyl (meth)acrylate, dicyclopentanyl (meth)acrylate, dicyclopentenyloxyethyl (meth)acrylate, and lauryl (meth)acrylate,
   (C) a trifunctional or higher multifunctional (meth)acrylate monomer,
   (D) a photopolymerization initiator,
   (E) a benzotriazole anticorrosive agent,
   (F) an anticorrosive pigment selected from a phosphate anticorrosive pigment and calcium ion-exchanged silica,
   (G) a phosphate ester, and further containing a lubricant.

6. A photocurable composition consisting essentially of:
   (A) a photocurable (meth)acrylate resin,
   (B) a (meth)acrylate monomer selected from a monofunctional (meth)acrylate monomer and a difunctional (meth)acrylate monomer, said monofunctional (meth)acrylate monomer being selected from the group consisting of 2-ethylhexyl (meth)acrylate, phenoxyethyl (meth)acrylate, ethoxyethyl (meth)acrylate, butoxyethyl (meth)acrylate, 2-hydroxypropyl (meth)acrylate, methyltriglycol (meth)acrylate, isodecyl (meth)acrylate, isobornyl (meth)acrylate, dicyclopentanyl (meth)acrylate, dicyclopentenyloxyethyl (meth)acrylate, and lauryl (meth)acrylate,
   (C) a trifunctional or higher multifunctional (meth)acrylate monomer,
   (D) a photopolymerization initiator,
   (E) a benzotriazole anticorrosive agent,
   (F) an anticorrosive pigment selected from a phosphate anticorrosive pigment and calcium ion-exchanged silica,
   (G) a phosphate ester, and further containing a fluorescent brightening agent.

7. The use of a photocurable composition as set forth in claim 1 as a material for forming a rust-preventing coating on a threaded joint for steel pipes.

8. A photocured coating formed from a photocurable composition as set forth in claim 1.

9. A photocured coating as set forth in claim 8 having a turbidity of at most 40%.

10. A metal substrate with a photocured coating having a photocured coating as set forth in claim 8 on the surface of the metal substrate.

11. A threaded joint for steel pipes with a photocured coating having a photocured coating as set forth in claim 8 on the surface of a pin and/or a box of the threaded joint for steel pipes.

12. A rust-preventing method for a threaded joint for steel pipes including the steps of applying a photocurable composition as set forth in claim 1 on the surface of a pin and/or a box of a threaded joint for steel pipes and then irradiating the coated surface with active energy rays to cure the composition and form a photocured coating.

13. A method of manufacturing a threaded joint for steel pipes with a photocured coating including the steps of applying a photocurable composition as set forth in claim 1 on the surface of a pin and/or a box of a threaded joint for steel pipes and then irradiating the coated surface with active energy rays to cure the composition and form a photocured coating.

* * * * *

UNITED STATES PATENT AND TRADEMARK OFFICE
CERTIFICATE OF CORRECTION

PATENT NO. : 8,586,644 B2
APPLICATION NO. : 13/295132
DATED : November 19, 2013
INVENTOR(S) : Nagareo et al.

It is certified that error appears in the above-identified patent and that said Letters Patent is hereby corrected as shown below:

Title Page

Item (73) Assignees
Chugoku Marine Paints, Ltd., Hiroshima (FR) should read:
Chugoku Marine Paints, Ltd., Hiroshima (JP)

Signed and Sealed this
Thirteenth Day of May, 2014

Michelle K. Lee
*Deputy Director of the United States Patent and Trademark Office*